United States Patent Office 2,949,405
Patented Aug. 16, 1960

2,949,405

MANUFACTURE OF DEHYDRO-COMPOUNDS OF THE STEROID SERIES

Albert Wettstein and Ernst Vischer, Basel, and Charles Meystre, Arlesheim, Switzerland, assignors to Ciba Pharmaceutical Products Inc., Summit, N.J.

No Drawing. Filed Feb. 6, 1956, Ser. No. 563,437

Claims priority, application Switzerland Feb. 7, 1955

5 Claims. (Cl. 195—51)

This invention relates to a process for the manufacture of dehydro compounds of the steroid series, containing double bonds in the 1:2- and the 4:5-positions. In copending U.S. application Serial No. 449,008, now U.S. Patent No. 2,904,472, filed August 10, 1954, by A. Wettstein and E. Vischer, there is described a process for the manufacture of oxidation products of the steroid series by the biochemical degradation of the side chain of pregnane compounds to form androstane compounds, and the splitting up, in certain cases, of the ring D, with the simultaneous introduction of a double bond into the 1:2-, or, if desired, into the 1- and 4-positions. In this manner, for example, progesterone, $\Delta^5$-3$\beta$-hydroxy-20-oxo-pregnene, 11-desoxycorticosterone and 3,20-dioxo-allopregnane can be converted in one step into $\Delta^{1,4}$-3,17-dioxo-androstadiene or 1:2-dehydro-testolactone.

The present invention is based on the observation that in steroid compounds, especially of the pregnane series, the 1:2-double bond and/or 4:5-double bond can be introduced into the steroid by a biochemical method without degradation of the side chain or splitting up of a ring. This is accomplished when steroid compounds which are saturated in 1:2-position and/or in 4:5-position are subjected to the aerobic action of enzymes of Didymella lycopersici, Calonectria decora, Alternaria passiflorae, Ophiobolus heterostrophus or Ophiobolus miyabeanus.

The steroid compounds used as starting materials are, for example, derivatives of spirostane, allospirostane, furostane, allofurostane, cholane, allocholane, pregnane, allopregnane, androstane and testane and contain, preferably in the 3-position, a free or functionally converted hydroxyl or oxo group. They may be saturated or may contain double bonds, for example in 1- or 4-position, and also in 5-, 6-, 7-, 8-, 9:11, 14- or 16-position, or additional substituents such as free or converted hydroxyl, or oxo or carboxyl groups or epoxy groups or halogen atoms, for example in 6-, 7-, 8-, 9-, 11-, 12-, 14-, 15-, 16-, 17-, 18-, 20-, or 21-position, or methyl groups, for example, in 17$\alpha$- or 17$\beta$-position. The above mentioned starting materials are of any steric configuration and may also exist are racemates. They also comprise compounds of the so called nor- and/or homo-series especially 19-nor- and D-homo-compounds. Especially important starting materials are compounds of the pregnane series which contain in 3- and 20-position free or functionally converted hydroxyl or oxo groups, for example progesterone, 11-dehydro-progesterone, 11-, 12-, 14-, 15-, 16-, 17- or 18-hydroxy-progesterones, $\Delta^5$- or $\Delta^4$-pregnane-3-ol-20-ones, $\Delta^5$-pregnene-3:20-diols, 11-desoxy-corticosterone, cortisone, hydrocortisone, 11-epi-hydro-cortisone, aldosterone, 18-hydroxy-corticosterone, 11-epi-18-hydroxy-corticosterone, 17$\alpha$-hydroxy-aldosterone, 18-hydroxy-hydrocortisone, 18-hydroxy- and 18-oxo-cortisone, 18-hydroxy- and 18-oxo-cortexone, Substance S (Reichstein), 18-hydroxy- and 18-oxo-Substance S (Reichstein), corresponding compounds, which are unsaturated, not in the 4-, but in the 1-position, pregnane-3:20-dione, pregnane-3-ol-20-one, allopregnane-3:20-dione, pregnane- and allopregnane-3:11-20-trione-17$\alpha$:21-diol, pregnane- and allopregnane-3:20-dione-11$\beta$:17$\alpha$:21-triol, pregnane- and allopregnane-3:8:20-trione-11$\beta$:21-diol, pregnane and allopregnane-3:20-dione-11$\beta$:18:21-triol, pregnane- and allopregnane-3:20-dione-18:21-diol, the corresponding 21-oxo-compounds and/or 9$\alpha$-fluoro- and chloro-derivatives for example 9$\alpha$-fluoro-cortisone, 9$\alpha$-fluoro-hydrocortisone, 9$\alpha$-fluoro-aldosterone and 9$\alpha$-fluoro-18-hydroxy-corticosterone, also androstane compounds saturated in 1:2-position, and/or in 4:5-position, for example $\Delta^4$- or $\Delta^5$-androstene-3:17-dione, testosterone, $\Delta^5$-androstene-3-ol-17-one, adrenosterone, androstane-3:17-dione, etianic acids, for example $\Delta^4$- or $\Delta^5$-etienic acids, alloetianic acids which contain hydroxyl or oxo-groups, especially in 3-, 11-, and/or 18-position, or functional derivatives of the same compounds, that is to say corresponding compounds with functionally converted hydroxyl or oxo-groups. In the starting materials the functionally converted hydroxyl group is, for example, a hydroxyl group esterified with an aliphatic, aromatic or heterocyclic carboxylic acid, for example, acetic acid, propionic acid, benzoic acid or furan carboxylic or an etherified hydroxyl group, for example the tetrahydropyranyloxy-, benzyloxy- or triphenylmethoxy-group. The functionally converted oxo-group is advantageously a ketalized oxo-group, derived especially from a dihydric alcohol, such as the ethylenedioxy group.

The specified starting materials are, in accordance with the invention, brought into reaction with enzymes of Didymella lycopersici, Calonectria decora, Alternaria passiflorae, Ophiobolus heterostrophus or Ophiobolus miyabeanus.

For the culture of these fungi, various media containing the desired nutrients may be employed. Preferred media are those containing sugar, such as glucose or lactose; peptones; corn steep liquor; soya products and the like. Advantageously, the culture medium may contain small quantities of mineral salts as well as synthetic nutrients.

The operation is conducted under aerobic conditions, for example, in a surface culture or preferably, submerged with stirring or shaking accompanied by passage of air through the culture liquid. The specified fungi are distinguished from other micro-organisms, such as bacteria, by abundant growth under relatively simple culture conditions.

According to the present invention the reaction may take place directly in the fungi cultures by addition of the starting material thereto or directly with the enzymes which are elaborated by the fungi. Alternatively, the mycelium may first be separated out and suspended or homogenized in an aqueous vehicle and contact of the starting material effected therewith. If desired, the starting material may be contacted with filtrates of the fungus mycelium or with aqueous extracts thereof.

The isolation of the products of the process can be carried out by known methods. Their separation can take place for example, by extraction of the reaction mixture with an organic solvent, for example methylene chloride or ethyl acetate. For the further purification of the resulting extract there can suitably be applied, especially chromatography, for example on alumina or silica gel, or distribution methods, for example the counter-current process, or separation by means of Girard reagents such as trimethyl ammonium or pyridinium acetic acid hydrazide. Subsequent to or instead of purification as above, recrystallization from organic or aqueous organic solvents may be preferably employed.

By the introduction of the 1:2-double bond and/or 4:5-double bond valuable medicaments of the steroid series, especially of the pregnane series are obtained, which are distinguished on comparison with therapeutically active compounds which are saturated in 1:2-position, by an enhanced activity. Of the products of the present process there may be especially mentioned $\Delta^{1:4}$ - 3:11:20 - trioxo - 17α:21 - dihydroxy - pregnadiene, $\Delta^{1:4}$ - 3:20 - dioxo - 11β:17α:21 - trihydroxypregnadiene, $\Delta^{1:4}$ - 3:11:20 - trioxo - 21 - hydroxypregnadiene, $\Delta^{1:4}$ - 3:20 - dioxo - 11β:21 - dihydroxypregnadiene, $\Delta^{1:4}$ - 3:20 - dioxo - 17α:21 - dihydroxypregnadiene, $\Delta^{1:4}$ - 3:20 - dioxo - 21 - hydroxy - pregnadiene, $\Delta^{1:4}$ - 3:18:20 - trioxo - 11β:21 - dihydroxypregnadiene, $\Delta^{1:4}$ - 3:11:18:20 - tetraoxo - 21 - hydroxypregnadiene, $\Delta^{1:4}$ - 3:20 - dioxo - 11β:18:21 - trihydroxy - pregnadiene, $\Delta^{14}$ - 3:18:20 - trioxo - 11β:17α:21 - trihydroxy - pregnadiene, $\Delta^{1:4}$ - 3:11:18: 20 - tetraoxo - 17α:21 - dihydroxy - pregnadiene, $\Delta^{1:4}$ - 3:20 - dioxo - 11β:17α:18:21 - tetrahydroxy - pregnadiene, $\Delta^{1:4}$ - 3:20 - dioxo - 18:21 - dihydroxy - pregnadiene, $\Delta^{1:4}$ - 3:18:20 - trioxo - 21 - hydroxy - pregnadiene, $\Delta^{14}$ - 3:20 - dioxo - 17α:18:21 - trihydroxypregnadiene. $\Delta^{1:4}$ - 3:18:20 - trioxo - 17α:21 - dihydroxy-pregnadiene, the corresponding 21-oxo- and 21-desoxy-compounds and also corresponding functional derivatives, such as esters, ethers, halogen derivatives, for example 9α-halogen, especially the fluorine or chlorine compounds. If the products of the process do not have the configuration and do not contain the substituents of therapeutically useful steroids, they can serve as intermediate products for the manufacture of such compounds, for example the above specified compounds.

The reaction products obtainable according to the process of the invention can be converted in the customary manner into their functional derivatives, such as oxygen, sulfur or nitrogen derivatives, for example esters, ethers, enol esters, enol ethers, ketals, thioethers and thioketals, also hydrazones, oximes and enamines. In these compounds the hydroxyl and/or oxo groups can be completely or partially functionally converted.

In the esters an enol esters the acid residues are derived from any organic or inorganic acids, such as aliphatic, alicyclic, araliphatic, aromatic or heterocyclic carboxylic, thione carboxylic, thiol carboxylic or sulfonic acids, preferably from formic acid, acetic acid, chloracetic acids, trifluoracetic acid, propionic acid, butyric acids, valeric acids, diethylacetic acid, caproic acids, oenanthic acids, caprylic acids, palmitic acids, crotonic acid, undecanic acid, undecylenic acid, oxalic acid, succinic acid, pimelic acid, maleic acid, lactic acid, carbamic acids, alkoxy-carboxylic acids, β-cyclopentylpropionic acid, hexahydrobenzoic acid, benzoic acid, phenylacetic acid, cyclohexylacetic acid, phenylpropionic acids, trimethylgallic acid, phthalic acid, furane-2-carboxylic acid, isonicotinic acid, methane sulfonic acid, toluene sulfonic acid, sulfuric acids, hydrohalic acids or phosphoric acids.

If desired, in resulting compounds functionally converted hydroxyl or oxo groups can be converted into free groups. In a similar manner in polysubstituted derivatives the functionally converted groups can also be partially liberated. This takes place, for example, by chemical or enzymatic hydrolysis, especially with the use of acid or basic agents, by re-esterification or re-acetalization. From derivatives obtained in this manner or also directly and which are only partially converted, for example esterified or etherified, by subsequent functional conversion, for example esterification or etherification, polysubstituted derivatives, especially mixed esters or mixed ethers or ester-ethers, can be produced.

The products of the present process can be used as medicaments or as intermediate products for the manufacture thereof. Thus the 1-dehydro compounds of cortisone, hydrocortisone, and 9α-fluoro-hydrocortisone show a stronger glycogenic action than the corresponding compounds without the double bond in 1,2-position.

The following examples illustrate the invention:

Example 1

4 liters of 70% beerwort are sterilized in a shaking vessel (pH 5.1) and inoculated with 150 cc. of a 2-day old agitation culture of *Calonectria decora* in 70% beerwort. The vessel is shaken for 24 hours at 27° C., whereby the culture becomes well-developed. A solution of 1 gram of cortexone in 25 cc. of acetone is then added under sterile conditions and the whole further shaken at 27° C. After 2 days, the mycelium is separated and well washed with water and ethyl acetate. After exhaustive extraction of the combined filtrates with a total quantity of 4 liters of ethyl acetate, the extracts are washed with water, dried and evaporated under vacuum. The resulting crude extract (1.1 grams) is chromatographed over a column of 30 grams of silica gel by fractional elution with chloroform and with chloroform-acetone mixtures of increasing acetone content. The individual fractions (100 cc. in each case) are investigated by paper chromatography. The frctions eluted with chloroform contain only impurities, whereas in the chloroform-acetone (9:1) fractions a new substance is found which in a paper chromatogram (system propylene glycol-toluene) wanders for a shorter distance than cortexone. The fractions of higher acetone content contain only a small quantity of highly polar material. The fractions containing the said new substance are combined and evaporated under vacuum. By recrystallization of the residue from acetone-petroleum ether mixtures, the pure 1-dehydro-cortexone is obtained of M.P. 185 to 192° C. in practically quantitative yield. This compound reduces alkaline silver diammine solution rapidly and strongly. The analysis agrees with the empirical formula $C_{21}H_{28}O_3$ (calculated: C, 76.79; H, 8.59%; found: C, 76.67; H, 8.84%). The ultraviolet spectrum of the free compound exhibits a strong band having a maximum at 244 mμ ($\epsilon$=14,200), that of the dinitrophenyl hydrazone exhibits a maximum at 388 mμ ($\epsilon$=39,000). The corresponding bands in the case of cortexone are at 240 mμ ($\epsilon$=16,200) and 378 mμ ($\epsilon$=39,000).

Example 2

By using for the dehydrogenation of cortexone instead of the culture of *Calonectria decora* described in Example 1, in an analogous manner a culture of *Alternaria passiflorae, Ophiobolus heterostrophus* or *Ophiobolus miyabeanus*, using the method of working up described in Example 1, 1-dehydrocortexone is obtained in high yield.

Example 3

By the method described in Example 1, in a shaking vessel, 4 liters of a culture of *Calonectria decora* are produced and, under sterile conditions, a solution of 1 gram of cortisone in 25 cc. of methanol is added thereto. The vessel is then shaken at 27° C. After 4 days, the mycelium is separated off and the culture filtrate is exhaustively extracted with a total quantity of 3 liters of ethyl acetate. The combined extracts are washed with water, dried and evaporated under vacuum. The resulting crude residue is chromatographed as described in Example 1 on 30 grams of silica gel by the fractional elution method. The fractions eluted with chloroform-acetone (6:4) mixtures consist for the most part of a substance which is somewhat more polar than the starting material. These fractions are combined and evaporated under vacuum. From acetone-ether mixtures the 1-dehydro-cortisone is crystallized; M.P. 231 to 234° C. The substance reduces alkaline silver diammine solution rapidly and strongly and exhibits in the ultraviolet spectrum a strong absorption at 240 mμ ($\epsilon$=15.800). By acetylation with pyridine-acetic anhydride, the corresponding 21-acetate is obtained of M.P. 224–230° C. In a similar manner there can be obtained, for example, the oenanthate or undecylenate.

Example 4

To 4 liters of a well developed culture of *Calonectria decora* there is added under sterile conditions a solution of 1 gram of hydrocortisone in 25 cc. of methanol. After shaking for 4 days at 27° C., extraction is carried out as described in Example 1 followed by chromatography in also similar manner. The fractions eluted with chloroform-acetone (1:1) mixtures contain a substance which is somewhat more polar than hydrocortisone. These fractions are combined and evaporated. The 1-dehydro-hydrocortisone is recrystallized from methanol or mixtures of acetone-ether; M.P. 238–241° C. It reduces alkaline silver diammine solution rapidly and strongly and exhibits in the ultraviolet spectrum a strong absorption at 244 m$\mu$ ($\epsilon$=15.100).

Example 5

In an Erlenmeyer flask of 500 cc. capacity 150 cc. of 70% beerwort are sterilized and inoculated with *Calonectria decora*. The whole is shaken for 2 days at 27° C. and there is added under sterile conditions to the now well developed culture a solution of 30 mg. of aldosterone in 1.5 cc. of acetone. Shaking is then continued at 27° C. and after 38 hours the mycelium is filtered off. The culture filtrate is exhaustively extracted with ethylene acetate and the extracts washed with water, dried and evaporated. The residue is chromatographed, as described in Example 1, on 1 gram of silica gel and the individual fractions (20 cc. in each case) are examined by paper chromatography. In the fractions eluted with chloroform-acetone (1:1) mixtures there is a substance which is somewhat more polar than aldosterone and reduces alkaline silver diammine solution. It is crystallized from acetone-ether mixtures and constitutes 1-dehydro-aldosterone. In the ultraviolet spectrum it exhibits strong absorption at 244 m$\mu$.

Example 6

In 14 Erlenmeyer flasks each of 200 cc. capacity 50 cc. of 70% beerwort per flask are sterilized and inoculated with *Calonectria decora*. After 2 days' shaking at 27° C. the cultures are well developed. Under sterile conditions there is added to each of the 14 cultures one of the following 14 compounds (in each case 10 mg. dissolved in 0.5 cc. of methanol); cortexone, cortisone, hydrocortisone, 17$\alpha$-hydroxy-cortexone, corticosterone, 11-epi-corticosterone, 11-epi-hydrocortisone, aldosterone, 17$\alpha$-hydroxyaldosterone, progesterone, pregnenolone, 21-hydroxypregnenolone, $\Delta^5$-androstene-3-ol-17-one and androstene-3:17-dione. Shaking is continued in each case for 2 days further at 27° C. and the cultures are then extracted with ethyl acetate. Paper chromatographic examination of the individual extracts shows that all of the starting substances have been converted into the corresponding 1-dehydrocompounds which compare with the starting materials possess a slightly increased polarity and are characteristically distinguished therefrom in their spectra.

Example 7

If there are used for the dehydrogenation of the substances specified in Example 6 instead of the cultures of *Calonectria decora* therein described, cultures of *Alternaria passifloria, Ophiobolus heterostrophus* or *Ophiobolus miyabeanus*, paper chromatographic examination of the extracts proves the presence of the same reaction products as are described in Example 6.

Example 8

A solution of 1 g. of 3:11:20-triketo-17$\alpha$:21-dihydroxy-allopregnane in 25 cc. of methanol is added under sterile conditions to 4 liters of a well developed culture of *Calonectria decora*. The mixture is agitated at 27° C. for 3 days and the mycelium then separated. The extraction of the culture filtrate and the chromatography of the crude extract are carried out in the manner described in Example 1. The portions extracted with mixtures of chloroform and acetone (1:1) contain the 1-dehydro-cortisone which is crystallized from mixtures of acetone and ether. Its melting point is at 230–233° C. and it has the properties described in Example 3.

When instead of the solution of 3:11:20-triketo-17$\alpha$:21-dihydroxy-allopregnane a solution of 3:11:20-triketo-17$\alpha$:21-dihydroxy-pregnane in 25 cc. of methanol is added to an analogous culture of *Calonectria decora* and the product worked up in the manner described, the 1-dehydro-cortisone is also obtained in good yield.

Example 9

Under sterile conditions, a solution of 1 g. of 3:20-diketo-11$\beta$:17$\alpha$:21-trihydroxy-allopregnane in 25 cc. of methanol is added to 4 liters of a culture of *Calonectria decora* and the mixture agitated at 27° C. for 4 days. The mycelium is then separated and the extraction of the culture filtrate and the chromatography of the extract carried out in the manner described in Example 1. From the portions eluted with mixtures of chloroform and acetone (1:1) the 1-dehydro-hydrocortisone crystallizes in good yield. Its melting point is at 239–242° C. and it has the properties described in Example 4.

Example 10

A solution of 1 g. of androstane-3:17-dione in 25 cc. of acetone is added under sterile conditions to 4 liters of a culture of *Calonectria decora*. After 36 hours' agitation at 27° C. the mycelium is separated and the culture filtrate exhaustively extracted by agitation with methylene chloride. The extract is washed twice with 0.1 N-hydrochloric acid and twice with sodium bicarbonate solution of 1 percent strength, washed three times with water, dried, and evaporated under reduced pressure. The residue (1.2 g.) is chromatographed over 30 g. of alumina by the fractional elution method, the elution being carried out with mixtures of petroleum ether and benzene, benzene, mixtures of benzene and ether, and ether. The fractions elutriated with mixtures of petroleum ether and benzene and those from benzene contain the known $\Delta^{1,4}$-androstadiene-3:17-dione, which crystallizes from a mixture of acetone and petroleum ether in the form of rhombic platelets. Its melting point is at 145–146° C; $[\alpha]_D = +110°$ (CHCl$_3$).

Example 11

A solution of 40 mg. of 1-dehydro-cortexone $$[\alpha]_D^{22} = +120° \text{ in CHCl}_3$$

in 2 cc. of pyridine is mixed with 2 cc. of acetic anhydride and allowed to stand at room temperature. After 16 hours the solution is evaporated under vacuo at 30° C. and the residue taken up in a mixture of chloroform and ether (1:4). The solution is washed three times with 0.1 N-hydrochloric acid, three times with sodium bicarbonate solution of 2 percent strength, and three times with water, then dried and evaporated under reduced pressure. By recrystallizing the residue from a mixture of acetone and petroleum ether there is obtained the pure 1-dehydro-cortexone-21-acetate of melting point 203–205° C; $[\alpha]_D = +134°$ (CHCl$_3$).

Example 12

A solution of 1 gram of 11-dehydrocorticosterone in 25 cc. of acetone is added under sterile conditions to 4 liters of a culture of *Calonectria decora*, grown as described in Example 1. The whole is agitated at 27° C. for 3 days and the mycelium then filtered off. The extraction of the culture filtrate and the chromatography of the crude extract on silica gel is performed as described in Example 1. The chloroform fractions and the chloroform-acetone (95:5) fractions contain impurities and some starting material, whereas the chloroform-acetone (90:10) fractions consist mainly of a substance which on the paper chromatogram flows somewhat more slowly than the starting material. This substance is the $\Delta^{1,4}$-3, 11,20-triketo-21-hydroxy-pregnadiene, which is crystallized from a mixture of acetone and ether. The crystals decompose between 200 and 220° C., depending on the speed of heating. In the ultraviolet light the substance absorbes at 240 m$\mu$, and in the infrared spectrum it shows the bands at 5.99$\mu$, 6.14$\mu$ and 6.22$\mu$ characteristic of the $\Delta^{1,4}$-3-keto grouping. On acetylation with pyridine-acetic anhydride the corresponding 21-acetate of melting point 188–191° C. is obtained. In a similar manner there can be prepared e.g. the enanthate or undecylenate.

Example 13

A solution of 1 gram of corticosterone in 25 cc. of acetone is added under sterile conditions to 4 liters of a culture of *Calonectria decora*, grown as described in Example 1. The whole is agitated at 27° C. for 4 days and the mycelium then filtered off. The extraction of the culture filtrate and the chromatography of the crude extract on silica gel is performed as described in Example 1. The chloroform fractions and the chloroform-acetone (95:5) fractions contain impurities and some starting material, whereas the chloroform-acetone (90:10) and (80:20) fractions consist mainly of a substance which on the paper chromatogram flows somewhat slower than the starting material. The substance is 1-dehydro-corticosterone, which is crystallized from acetone. It melts at 216–220° C. (with decomposition); $[\alpha]_D = +158°$ (alcohol). In ultraviolet light the substance absorbes at 244 m$\mu$ ($\epsilon = 15,300$) and in the infrared spectrum it shows bands at 2.76$\mu$, 2.86$\mu$, 5.99$\mu$, 6.14$\mu$, 6.22$\mu$, 7.44$\mu$, 8.73$\mu$, 9.22$\mu$, 9.38$\mu$ and 9.63$\mu$.

The 21-acetate prepared by means of a mixture of pyridine and acetic anhydride at 20° C. melts at 159–161° C.; $[\alpha]_D = +151°$ (dioxane); U.V. absorption spectrum $\lambda_{max}$ 243 m$\mu$ ($\epsilon = 14,800$).

Example 14

A solution of 1 gram of 17$\alpha$-hydroxy-cortexone (Reichstein's Substance S) in 25 cc. of methanol is added under sterile conditions to 4 liters of a culture of *Calonectria decora*, grown as described in Example 1. The whole is agitated for 3 days at 27° C. and the mycelium then filtered off. The extraction of the culture filtrate and the chromatography of the crude extract on silica gel is performed as described in Example 1. The chloroform fractions and the chloroform-acetone (97.5:2.5) fractions contain impurities, while with a mixture of chloroform and acetone (95:5) some starting material is eluated. The chloroform-acetone (90:10) fractions consist of a mixture containing, in addition to a small amount of starting material and more polar products, mainly 1-dehydro-17$\alpha$-hydroxy cortexone. This substance is obtained in pure form on crystallization from acetone; melting point, 227°–233° C. (decomposition); $[\alpha]_D = +76°$ C. (ethanol); U.V. absorption spectrum $\lambda_{max}$ 244 m$\mu$ ($\epsilon = 16,200$). The infrared spectrum shows bands at 2.76$\mu$, 2.85$\mu$, 5.84$\mu$, 6.00$\mu$, 6.15$\mu$, 6.23$\mu$, 9.01$\mu$, 9.20$\mu$, 9.55$\mu$ and 10.04$\mu$.

The 21-acetate prepared by means of pyridine-acetic anhydride melts at 216–222° C; $[\alpha]_D$ +86° (dioxane); U.V. absorption spectrum $\lambda_{max}$ 244 m$\mu$ ($\epsilon = 15,400$).

Example 15

A solution of 1 gram of progesterone in 25 cc. of acetone is added under sterile conditions to 4 liters of a culture of *Calonectria decora* grown as described in Example 1. The culture is shaken for 24 hours at 27° C., and the mycelium is then filtered off. The culture filtrate is extracted as described in Example 1. The crude extract is chromatographed over a column of 30 grams of aluminum oxide free from alkali, the separate fractions (of 100 cc. each) being examined by paper-chromatography. The petroleum ether-benzene fractions contain starting material, whilst with benzene chiefly 1-dehydroprogesterone is eluated. The latter is crystallized from a mixture of ether and petroleum ether. Melting point = 151–152° C.; $[\alpha]_D^{23} = 120°$ (ethanol); ultraviolet absorption spectrum $\lambda$ maximum 245 m$\mu$ ($\epsilon = 16,150$). In the infrared there are bands inter alia at 5.86$\mu$, 5.99$\mu$, 6.14$\mu$, 6.23$\mu$, 7.23$\mu$, 7.38$\mu$, 8.33$\mu$, 8.62$\mu$, 10.55$\mu$ and 12.24$\mu$.

Example 16

In a shaking vessel 1 liter of a nutrient solution, containing 15 grams of peptone, 10 cc. of corn steep liquor, 0.1 gram of crude glucose and tap water, is adjusted to a pH value of 6.8 and sterilized. It is then inoculated with a culture of *Calonectria decora*. The culture is shaken for 48 hours at 27° C. A solution of 250 mg. of cortisone in 8 cc. of methanol is then added to the well developed culture under sterile conditions. The culture is further shaken at 27° C., after three days the mycelium is filtered off and the culture filtrate is extracted with ethyl acetate as described in Example 1. The examination by paper-chromatography of the crude extract shows that in addition to few more polar components only 1-dehydro-cortisone but no starting material is present any longer. By means of crystallization form a mixture of acetone and ether and from methanol the 1-dehydro-cortisone is obtained in a pure form.

Example 17

2 grams of sodium nitrate, 1 gram of primary potassium ortho-phosphate, 0.5 gram of magnesium sulfate heptahydrate, 0.5 gram of potassium chloride, 50 grams of glucose and 1 gram of Difco yeast extract are dissolved in 1 liter of tap water, brought to pH 5 by addition of a sodium hydroxide solution and sterilized. The resulting nutrient solution is inoculated with 50 cc. of a four day-old shaking culture of *Didymella lycopersici* and shaken for 48 hours at 27° C., whereby the culture becomes well developed. Then under sterile conditions a solution of 250 mg. of cortexone in 10 cc. of acetone is added. The whole is shaken for a further two days at 27° C., the mycelium then filtered off with suction, washed with water and ethyl acetate and the combined filtrates extracted with ethyl acetate. The ethyl acetate solutions are washed with water, dried and evaporated under vacuum and resulting crystalline residue, on paper-chromatographic examination in the system Bush B$_3$ (ligroin:benzene:methanol:water (6.67:3.33:8.0:2.0)) is found to be practically pure 1-dehydrocortexone. For purification, a solution thereof in chloroform is run through a layer of silica gel. The chloroform filtrate contains a little oil. The further filtrates, obtained with chloroform with the addition of 1–3% of teritary butanol are combined and evaporated. The residue, on recrystallization from a mixture of acetone-isopropyl ether yields 220 mg. of 1-dehydrocortexone of M.P. 189–195° C. (with decomposition).

Example 18

To 1 liter of a well developed culture of *Didymella lycopersici*, prepared as described in Example 17, there is added under sterile conditions a solution of 250 mg. of cortisone in 10 cc. of methanol and the whole is shaken for 72 hours at 27° C., after which the culture liquid is worked up as described in Example 17. On the basis of paper-chromatographic examination in the system propylene glycol-toluene, the residue of the ethyl acetate extracts contains as steroid fraction 1-dehydrocortisone practically exclusively. The residue, in chloroform solution, is filtered through silica gel. The chloroform filtrates give a little of an oil. With chloroform-acetone (6:4) a crystalline residue is obtained which on recrystallization from a mixture of acetone and ether, gives 225 mg. of pure 1-dehydrocortisone of M.P. 231–234° C.

Example 19

To 1 liter of a well developed culture of *Didymella lycopersici*, prepared as described in Example 17, there is added under sterile conditions a solution of 250 mg. of hydrocortisone in 10 cc. of methanol. After shaking for ten days at 27° C., the culture is worked up as described in Example 17. The residue of the ethyl acetate solutions, in a paper-chromatogram (system propylene-glycol-toluene) proves to be practically pure 1-dehydro-cortisone. For separation of the accompanying substances it is taken up in chloroform and the solution filtered through silica gel. The chloroform eluates, which contain a small quantity of an oil, are rejected. The chloroform-acetone (1:1) eluates are combined and evaporated. The residue is recrystallized from methanol or an acetone-ether mixture, whereby 210 mg. of pure 1-dehydro-hydrocortisone of M.P. 238–241° C. are obtained.

Example 20

To 120 cc. of a well developed culture of *Didymella lycopersici* obtained as described in Example 17, is added under sterile conditions a solution of 30 mg. of 3:11:20-triketo-17α:21-dihydroxy-allopregnane in 2 cc. of methanol. The whole is shaken for ten days at 27° C. and the culture worked up as described in Example 17. On the basis of paper-chromatographic examination in the system propylene glycol-toluene, the residue of the ethyl acetate extracts contains, together with unchanged starting material, 1-dehydrocortisone, which is obtained in pure form by chromatography on silica gel and subsequent crystallization from a mixture of acetone and ether.

Example 21

In an analogous manner the corresponding $\Delta^{1,4}$-dienes are obtained from progesterone, $\Delta^1$-allopregnene-3:20-dione, pregnane-3:20-dione, corticosterone, 11-dehydro-corticosterone, 17α-hydroxy-cortexone, testosterone and $\Delta^1$- or $\Delta^4$-androstene-3:17-dione.

Example 22

To 2 liters of a well developed culture of *Didymella lycopersici* obtained as described in Example 17, there is added under sterile conditions a solution of 500 mg. of $\Delta^4$-3:11:20-trioxo-17α-methyl-21-acetoxy-pregnene in 15 cc. of acetone. Shaking is carried out for 3 days at 27° C. and working up then effected as described in Example 17. The extraction residue (585 mg.), on the basis of paper-chromatographic examination, consists practically exclusively of $\Delta^{1,4}$-3:11:20-trioxo-17α-methyl-21-hydroxy-pregnadiene. By crystallization from an acetone-petroleum ether mixture it is obtained in needles which melt at 183–186° C. with slight decomposition; $[\alpha]_D = +120°$ (alcohol), ultra violet absorption $\lambda_{max}$ 240 m$\mu$ ($\epsilon$ 14,600). The infrared spectrum shows the characteristic bands for $\Delta^{1,4}$-3-ketones at 5.98$\mu$; 6.13$\mu$ and 6.21$\mu$. The 21-acetate prepared with pyridine-acetic anhydride melts at 198–201° C.; $[\alpha]_D^{24} = +135°$ (chloroform), U.V.-absorption spectrum $\lambda_{max}$ 240 m$\mu$ ($\epsilon$=14,800).

Example 23

To four liters of a well deevloped culture of *Didymella lycopersici* obtained as described in Example 17, there is added under sterile conditions a solution of 1 gram of 17α-ethinyl-testosterone in 25 cc. of acetone. Shaking is carried out for 8 days at 27° C. and the culture then worked up as described in Example 17. Paper-chromatographic examination of the extraction residue shows that it consists practically exclusively of 1-dehydro-17α-ethinyltestosterone. By crystallization from a mixture of acetone and ether the pure substance is obtained. M.P. 228–223° C.; $[\alpha]_D = -17°$ (chloroform).

Example 24

To 2 liters of a well developed culture of *Didymella lycopersici* prepared as described in Example 17, there is added under sterile conditions a solution of 180 mg. of 6-dehydro-cortexone-21-acetate in 10 cc. of acetone and the whole is then shaken for three days at 27° C. The culture is then worked up as described in Example 17. According to paper-chromatographic examination the extraction residue (190 mg.) consists practically exclusively of free 1:6-bis-dehydro-cortexone, which is crystallized from acetone-ether mixtures. In the infrared spectrum are the characteristic bands for the $\Delta^{1,4}$-3-ketones at 5.98$\mu$, 6.13$\mu$ and 6.22$\mu$. It melts at 166–168° C.; $[\alpha]_D = +112°$ (acetone). The 21-acetate prepared with pyridine-acetic anhydride melts at 158–162° C.; $[\alpha]_D^{25} = +123°$ (ethanol). U.V.-absorption spectrum $\lambda_{max}$ 223 m$\mu$ ($\epsilon$=11,600), 256 m$\mu$ ($\epsilon$=9,900) and 300 m$\mu$ ($\epsilon$=12,800).

Example 25

To 4 liters of a well developed culture of *Didymella lycopersici* obtained as described in Example 17, is added under sterile conditions a solution of 1 gram of 11-dehydro-progesterone in 20 cc. of acetone. Shaking is carried out for eight days at 27° C. and working up then effected as described in Example 17. In the extraction residue, by paper-chromatographic examination, only 1:11-bis-dehydro-progesterone can be detected. It is obtained in crystalline form from an acetone-petroleum ether mixture and in the infrared spectrum exhibits, among others, bands at 5.98$\mu$, 617$\mu$ and 6.22$\mu$. It melts at 166–168° C.; $[\alpha]_D^{24} = 112°$ (acetone); U.V. absorption spectrum $\lambda_{max}$ 245 m$\mu$ ($\epsilon$=17,750).

Example 26

To 2 liters of a well developed culture of *Didymella lycopersici* obtained as described in Example 17, under sterile conditions a solution of 500 mg. of 17α-methyl-testosterone in 15 cc. of acetone is added. Shaking is carried out for three days at 27° C. and the culture then worked up as described in Example 17. The extraction residue is dissolved in a little acetone. On addition of ether, the 1-dehydro-17α-methyl-testosterone is obtained in compact crystals. M.P. 163–164° C.; $[\alpha]_D = \pm 0°$ (chloroform). U.V. absorption spectrum $\lambda_{max}$ 245 m$\mu$ ($\epsilon$=15,600).

Example 27

2 grams of sodium nitrate, 1 gram of primary potassium orthophosphate, 0.5 gram of magnesium sulfate heptahydrate, 0.5 gram of potassium chloride, 50 grams of glucose and 1 gram of Difco yeast extract are dissolved in 1 liter of tap water, brought to pH 5 by addition of a sodium hydroxide solution and sterilized. The resulting nutrient solution is inoculated with 50 cc. of a four day-old shaking culture of *Didymella lycopersici* and the whole shaken for 48 hours at 27° C. as a result of which the culture becomes well developed. To 120 cc. of this culture of *Didymella lycopersici* is added under sterile conditions a solution of 30 mg. of 9α-fluoro-hydrocortisone in 2 cc. of methanol. Shaking is carried out for five days at 27° C. and then the mycelium is filtered off with suction and washed with water and ethyl acetate and the combined filtrates extracted with ethyl acetate. The ethyl acetate solutions are washed with water, dried and evaporated under vacuum. The extraction residue contains, on the basis of paper-chromatographic examination, 1-dehydro-9α-fluoro-hydrocortisone, which can be separated from unchanged starting material by means of a preparative paper-chromatogram (propylene glycol-toluene system). From acetone it forms crystals of melting point 263–266° C. (with decomposition), $[\alpha]_D^{23} = +108°$ (ethanol). U.V. absorption spectrum $\lambda_{max}$ 240 m$\mu$ ($\epsilon$=15,800). The product obtained in this way is dried under high vacuum and acetylated in the usual way at room temperature with 4 cc. of a pyridine-acetic anhydride-(1:1)-mixture. The resulting 21-acetate of 1-dehydro-9α-fluoro-hydrocortisone is recrystallized from an acetone-petroleum ether mixture and melts at 244–246° C. (with decomposition), $[\alpha]_D^{23} = +108°$ (dioxane), U.V. absorption spectrum $\lambda_{max}$ 240 mμ ($\epsilon = 16,250$).

*Example 28*

2 grams of sodium nitrate, 1 gram of primary potassium orthophosphate, 0.5 gram of magnesium sulfate heptahydrate, 0.5 gram of potassium chloride, 50 grams of glucose and 1 gram of Difco yeast extract are dissolved in 1 liter of tap water, brought to pH 5 by addition of a sodium hydroxide solution and sterilized. The resulting nutrient solution is inoculated with 50 cc. of a four day old shaking culture of *Didymella lycopersici* and the whole shaken for 48 hours at 27° C. as a result of which the culture becomes well developed. To 120 cc. of this culture of *Didymella lycopersici* is added under sterile conditions a solution of 30 mg. of 9:11β-oxido-17α-hydroxy-cortexone-21-acetate in 2 cc. of methanol. Shaking is carried out for five days at 27° C. and then the mycelium is filtered off with suction and washed with water and ethyl acetate and the combined filtrates extracted with ethyl acetate. The ethyl acetate solutions are washed with water, dried and evaporated under vacuum. The extraction residue contains, on the basis of paper-chromatographic examination, 1-dehydro-9:11β-oxido-17α-hydroxy-cortexone, which is separated by means of a preparative paper-chromatogram (system propylene glycol-toluene) from unchanged starting material. The crude product is dried under high vacuum and acetylated in the usual way at room temperature with 4 cc. of a pyridine-acetic anhydride-(1:1)-mixture.

The resulting 1-dehydro-9:11β-oxido-17α-hydroxy-cortexone-21-acetate (30 mg.) is dissolved in 5 cc. of dioxane and the solution mixed with 1.25 cc. of 2.5 N hydrofluoric acid in chloroform and the whole allowed to stand for 1 hour at room temperature. Then water is added and extraction carried out with chloroform-ether (1:3). After washing with water, drying and evaporation of the solvent under vacuum there is obtained the 1-dehydro-9α-fluoro-hydrocortisone-21-acetate of M.P. 235–237° C.

What is claimed is:

1. A process which comprises the steps of treating 9,11β-oxido-17α-hydroxy-cortexone acetate with an enzyme of a fungus selected from the group consisting of *Didymella lycopersici, Calonectria decora, Alternaria passiflorae, Ophiobolus heterostrophus* and *Ophiobolus miyabeanus* under aerobic conditions.

2. A process for the dehydrogenation of steroids which comprises subjecting a steroid compound which is saturated in at least one of the 1:2 and 4:5-positions to the action of an anzyme of fungi selected from the group consisting of *Didymella lycopersici, Calonectria decora, Alternaria passiflorae, Ophiobolus heterostrophus* and *Ophiobolus miyabeanus* under aerobic condition and separating the resulting $\Delta^{1,4}$-unsaturated steroid.

3. A process for the dehydrogenation of steroids which comprises subjecting a pregnane compound which is saturated in at least one of the 1:2 and 4:5-positions to the action of an anzyme of fungi selected from the group consisting of *Didymella lycopersici, Calonectria decora, Alternaria passiflorae, Ophiobolus heterostrophus* and *Ophiobolus miyabeanus* under aerobic conditions and resulting $\Delta^{1,4}$-unsaturated steroid.

4. A process for the dehydrogenation of steroids which comprises subjecting a 3-oxygenated pregnane compound which is saturated in at least one of the 1:2 and 4:5-positions to the action of an enzyme of fungi selected from the group consisting of *Didymella lycopersici, Calonectria decora, Alternaria passiflorae, Ophiobolus heterostrophus* and *Ophiobolus miyabeanus* under aerobic conditions and separating the resulting $\Delta^{7,14}$-unsaturated steroid.

5. A process for the dehydrogenation of steroids which comprises subjecting a 3-oxygenated androstane compound which is saturated in at least one of the 1:2 and 4:5-positions to the action of an anzyme of fungi selected from the group consisting of *Didymella lycopersici, Calonectria decora, Alternaria passiflorae, Ophiobolus heterostrophus* and *Ophiobolus miyabeanus* under aerobic conditions and separating the resulting $\Delta^{7,14}$-unsaturated steroid.

References Cited in the file of this patent

UNITED STATES PATENTS

| | | |
|---|---|---|
| 2,656,349 | Ruzicka | Oct. 20, 1953 |
| 2,671,084 | Lincoln | Mar. 2, 1954 |
| 2,721,163 | Shull | Oct. 18, 1955 |
| 2,721,828 | Murray | Oct. 25, 1955 |
| 2,744,120 | Fried et al. | May 1, 1956 |
| 2,756,179 | Fried et al. | July 24, 1956 |

OTHER REFERENCES

Vischer et al.: Experientia, 9, 1953, page 371.

Vischer et al.: Helv. Chim. Acta 37, 1955, pp. 835–840.

UNITED STATES PATENT OFFICE
CERTIFICATION OF CORRECTION

Patent No. 2,949,405                                      August 16, 1960

Albert Wettstein et al.

It is hereby certified that error appears in the above numbered patent requiring correction and that the said Letters Patent should read as corrected below.

Column 2, line 3, for "3:8:20" read -- 3:18:20 --; column 3, line 14, for "$\Delta^{14}$" read -- $\Delta^{1:4}$ --; line 20, for "$\Delta^{14}$" read -- $\Delta^{1:4}$ --; column 5, line 26, for "ethylene" read -- ethyl --; column 7, line 34, for "2.86μ, 5.99μ," read -- 2.86μ, 5.84μ, 5.99μ, --; column 9, line 75, for "228-223° C." read -- 228-233° C. --; column 10, line 31, for "5.98μ, 617μ" read -- 5.98μ, 6.17μ --; column 12, line 17, after "conditions and" insert -- separating the --; line 26, for "$\Delta^{7:14}$" read -- $\Delta^{1:4}$ --; line 34, for "$\Delta^{7:14}$" read -- $\Delta^{1:4}$ --.

Signed and sealed this 8th day of August 1961.

(SEAL)
Attest:
ERNEST W. SWIDER                                 DAVID L. LADD
Attesting Officer                               Commissioner of Patents